US012691525B2

(12) United States Patent
Kuo et al.

(10) Patent No.: US 12,691,525 B2
(45) Date of Patent: Jul. 28, 2026

(54) MACHINING FLUID AND MACHINING DEVICE USING THE SAME

(71) Applicant: National Yunlin University of Science and Technology, Yunlin (TW)

(72) Inventors: Chia-Lung Kuo, Yunlin (TW); Yuan-Jen Chang, Yunlin (TW); Zong-Lun Wu, Yunlin (TW)

(73) Assignee: National Yunlin University of Science and Technology, Yunlin (TW)

( * ) Notice: Subject to any disclaimer, the term of this patent is extended or adjusted under 35 U.S.C. 154(b) by 892 days.

(21) Appl. No.: 17/964,861

(22) Filed: Oct. 12, 2022

(65) Prior Publication Data

US 2023/0123283 A1      Apr. 20, 2023

(30) Foreign Application Priority Data

Oct. 18, 2021      (TW) ................................. 110138622

(51) Int. Cl.
*B23K 26/146* (2014.01)
*B23K 26/14* (2014.01)

(52) U.S. Cl.
CPC ........ *B23K 26/146* (2015.10); *B23K 26/1464* (2013.01)

(58) Field of Classification Search
CPC .... B23K 26/146; B23K 26/1464; B23H 1/10; B23H 1/028; B23H 9/14; B23H 7/36; B23H 7/265
See application file for complete search history.

(56) References Cited

U.S. PATENT DOCUMENTS 6,639,172 B1 * 10/2003 Goto ........................ B23H 7/02
                                                          219/69.12
11,203,075 B2    12/2021 Takahashi
11,247,282 B2    2/2022 Takahashi
(Continued)

FOREIGN PATENT DOCUMENTS

CN      107876976 A      4/2018
CN      109014455 A      12/2018
CN      109014456 A      12/2018

OTHER PUBLICATIONS

Official action issued by Taiwan Intellectual and Property Office on Aug. 24, 2022.

*Primary Examiner* — Brian W Jennison
(74) *Attorney, Agent, or Firm* — LANWAY IPR SERVICES; Chun-Ming Shih

(57) ABSTRACT

The present invention provides a machining fluid comprising a first phase fluid and a second phase fluid pressurized to be dissolved in the first phase fluid. The present invention further provides a machining device comprising an injecting head having a nozzle and a flow channel communicating with the nozzle for guiding the machining fluid to the nozzle injecting the machining fluid to an object. Alternatively, the present invention further provides a machining device comprising a light source for generating a laser beam and an injecting head having a nozzle and a flow channel communicating with the nozzle. The flow channel guides a machining fluid having a first phase fluid and a second phase fluid such that the machining fluid is injected to an object by the nozzle. The injecting head also receives the laser beam and guides the laser beam to the object through the nozzle.

13 Claims, 11 Drawing Sheets

(56) References Cited

U.S. PATENT DOCUMENTS

| | | | |
|---|---|---|---|
| 2013/0031945 A1* | 2/2013 | Ohmi | B23Q 11/1061 |
| | | | 72/342.2 |
| 2017/0065940 A1* | 3/2017 | Mizutani | C02F 9/00 |
| 2017/0320163 A1* | 11/2017 | Hu | B23H 1/04 |
| 2019/0388989 A1* | 12/2019 | Takahashi | B23H 7/265 |

* cited by examiner

MACHINING FLUID AND MACHINING DEVICE USING THE SAME

This application claims the benefit of Taiwan Patent Application Serial No. 110138622, filed Oct. 18, 2022, the subject matter of which is incorporated herein by reference.

BACKGROUND OF INVENTION

1. Field of the Invention

The present invention is related to a machining fluid, and more particularly, to a machining liquid formed by a first phase fluid and a second phase fluid which is a gas pressurized to be dissolved into the first phase fluid and a machining device using the machining fluid for machining the work piece

2. Description of the Prior Art

With the great advance of the machining technology, the miniaturization of manufacturing components or parts is greatly required in each industrial field, in which the micro hole structures play a vital role in the miniaturized components or parts. Nevertheless the micro hole structures can be broadly applied in different industrial field, especially in aerospace industry, biotechnology industry, optical semiconductor industry and medical and health industry, the issues that how to effectively control the roughness and machining precision of the micro hole structures formed on the work piece will affect the evolution of the machining process.

In the high precision machining field, a machining technology using high heat for machining work piece, such as electrical discharge machining for forming tiny holes or water jet-guided laser, WJL, for example, is indispensable. The drilling EDM is a main machining device for forming tiny or deep holes having high aspect ratio on the work piece. The drilling EDM comprises a chuck coupled to the main spindle for holding and rotating the tubular electrode. Through the rotation of the tubular electrode, the tubular electrode further injects the highly pressurized machining fluid and is energized to performing EDM process on the object whereby a plurality of tiny holes and deep holes can be formed on the work piece. Alternatively, WJL machining device is utilized to focus the laser beam and allow the focused laser beam to pass through the water-pressurized chamber. The water-pressurized chamber generates a water jet toward the work piece wherein the water jet is also utilized to guide the laser beam through a total internal reflection within the injected water. The water jet and the focused laser beam are utilized to machining the work piece simultaneously. In the above-mentioned drilling EDM and WJL machining process, the common characteristic is that the water having normal pressure (latm=0.1 MPa) is compressed to form a pressurized water having high pressure ranged between 0.3 MPa-80 MPa. The pressurized water is injected to the work piece through the tubular electrode having inner diameter ranged between 0.02 mm-0.5 mm, e g electrode of the drilling EDM, or is injected through nozzle having inner diameter ranged between 0.01 mm-0.2 mm, e g nozzle of WJL machining device, thereby generating machining effects onto the work piece.

Please refer to the FIG. 1A, which illustrates a conventional drilling EDM device. One end of the wire electrode 10 is held by the rotating chunk 11 while the other end passes through the diamond die 12 arranged below the spindle. During the machining process for forming the hole structures on the work piece, the wire electrode 10 having hollow channel is adapted, and the machining fluid, e.g. water or oil for example, passes through the pipelines and enters the hollow channel of the tubular electrode thereby generating injection flow for machining process. The injected flow can be utilized to provide lubricant effect and to discharging the machining debris or waste during the EDM processing. Conventionally, since the diameter of the tubular electrode is getting smaller, such as the outer diameter around 0.1 mm, and inner diameter 0.035 mm, using the conventional pressure pump for increasing the machining fluid pressure cannot effectively pump the machining fluid into the hollow channel of the tubular electrode such that the machining efficiency of the drilling EDM process will be greatly reduced. The main reason is that when the machining fluid passes through the pipeline, the friction force interacted between the machining fluid and inner pipe wall will reducing the kinematic energy of the machining fluid inside the pipeline thereby dropping down the flow pressure of the machining fluid so that the machining efficiency is greatly reduced. It is noted that according to the Hagne-Poiseuille's equation listed as equation (1) shown below, the $\Delta P$ represents the pressure loss, L represents length of the pipeline where the flow, e.g. machining fluid, flowing therein, $\mu$ represents dynamic viscosity, Q represents volume flow rate, r represents radius of the pipeline, and $\Delta P$ is proportional to the dynamic viscosity $\mu$, length of the pipeline L, as well as the volume flow rate Q, and is inversely proportional to the fourth power of radius r and is proportional to the dynamic viscosity $\mu$.

$$\Delta P = \frac{8\mu L Q}{\pi r^4} \tag{1}$$

It is also note that the common characteristic between drilling EDM and WJL is that the high pressure flow passes through the narrow radius r of the pipeline such that the pressure loss $\Delta P$ is dramatically reduced. In the real operation of the machining procedure, since the pressure loss $\Delta P$ of the pump is quietly huge so that it is necessary to consume more power energy to maintain the operation pressure of the machining fluid during the machining process thereby increasing the machining cost.

Accordingly, there is a need to provide a machining fluid and machining device using the machining fluid for solving the insufficient part of the conventional arts.

SUMMARY OF THE INVENTION

According to Henry's Law, since the solubility of gas in the solvent is very low, the solution that the gas dissolved in belongs to the dilute solution and the quantity of the solved gas inside the solvent, either Mole number or Molality, is approximately proportional to the gas pressure. In one embodiment of the machining fluid provided in the present invention, the machining fluid comprises a first phase fluid and a second phase fluid dissolved into the first phase fluid through high pressure for reducing the viscosity of the machining fluid. Since the high pressurized gas is dissolved into the machining fluid, according to the Hagen-Poiseuilles Equation, it is capable of reducing the dynamic viscosity such that the friction force between the machining fluid and the flow channel or nozzle can be reduced thereby reducing the resistance between the machining fluid and the flow channel or nozzle. Moreover, the second phase fluid can be a combustion gas, a flammable gas or a combination of flammable gas and combustion gas such that the second phase fluid can be acted as the fuel or combustion adjuvant during the machining process whereby, in addition to the merit of traditional machining fluids, the addition of flammable gas or combustion-supporting gas properties can help produce high-temperature cutting effects during machining.

The present invention provides a machining device comprising a machining fluid formed by combining two phases of gas and liquid or dissolving gas into liquid through high pressure to form machining fluid. The machining fluid is injected to a work piece by an injection head, so that the machining fluid can effectively flow into the machining position thereby achieving cooling, discharging and removing the machining debris, lubrication, reduction of the kinematic viscosity of the machining fluid. In addition, the energy of burning spontaneous flammable gas or combustion of combustion-supporting gas will help generate high temperature for increasing the effect of machining debris removal thereby achieving the effect of increasing the cutting speed. In one embodiment, the volume fraction of the gas and liquid is different from each other whereby an atomized machining fluid or machining fluid having nano bubbles can be formed such that the machining fluid can pass through the tiny hollow channel inside the wire electrode of EDM more smoothly and easily thereby increasing the efficiency of the machining process. It is noted that, according to the Hagen-Poiseuilles Equation, the viscosity of the pure water (0.8 mPa-s) is 44 times of the air viscosity (18 μPa-s); therefore, when the micro scale or nano scale gas bubbles are mixed into the liquid, it is capable of reducing the dynamic viscosity μ and reducing the pressure loss ΔP. Furthermore, the friction force between the machining fluid and the inner wall of the flow channel or nozzle can be reduced by reducing the dynamic viscosity μ thereby reducing the abrasion of the flow channel such that not only can the cost due to the component abrasion of machining device, e.g. nozzle, can be effectively lowered but also the machining precision and efficiency can also be enhanced.

Please refer to FIG. 1B, which illustrates a weight measurement result of a titration experiment under normal pressure (1 atm) for 20 minutes with respect to different machining fluids, e.g. water, respectively mixed with nano bubbles and exerted by different pressure condition. In the experimental graph, it shows that the titration weight of water is decreased with the pressure increasingly exerted on the machining fluid. When the pressure exerted on the machining fluid reaches 60~90 (kg/cm²), the weight of titration is almost close to the titration of RO water having no nano bubbles. This is because the originally mixed bubbles inside the machining fluid are broken due to the high pressure exerted on the machining fluid. Although the quantity of dissolved gas in the machining fluid is proportional to the external pressure exerted onto the machining fluid, the illustrated titration experiment is held under normal pressure (1 atm), and the original mixed bubbles are broken after high pressure exerted on the machining fluid; therefore, the dynamic viscosity μ is almost the same as the RO water without having nano scale bubbles.

In one embodiment, the present invention provides a machining fluid having a first phase fluid and a second phase fluid, which is a gas dissolved in the first phase fluid through a high pressure. In another embodiment, the present invention further provides a machining device comprising an injection head having a nozzle, and a flow channel arranged inside the injection head and communicated with the nozzle, wherein the machining fluid is guided by the flow channel and is injected from the nozzle.

In another embodiment, the present invention further provides a machining device comprising an optical device for generating a laser beam, and an injection head comprising a nozzle and a flow channel connected to the nozzle. The machining fluid is guided by the flow channel and is injected to the work piece through the nozzle of the injection head. The laser beam received by the injection head is emitted from the nozzle and is guided to the work piece by the machining liquid injected from the nozzle, wherein the machining fluid has a first phase fluid and a second phase fluid.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a machining fluid and a machining device using the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2A:
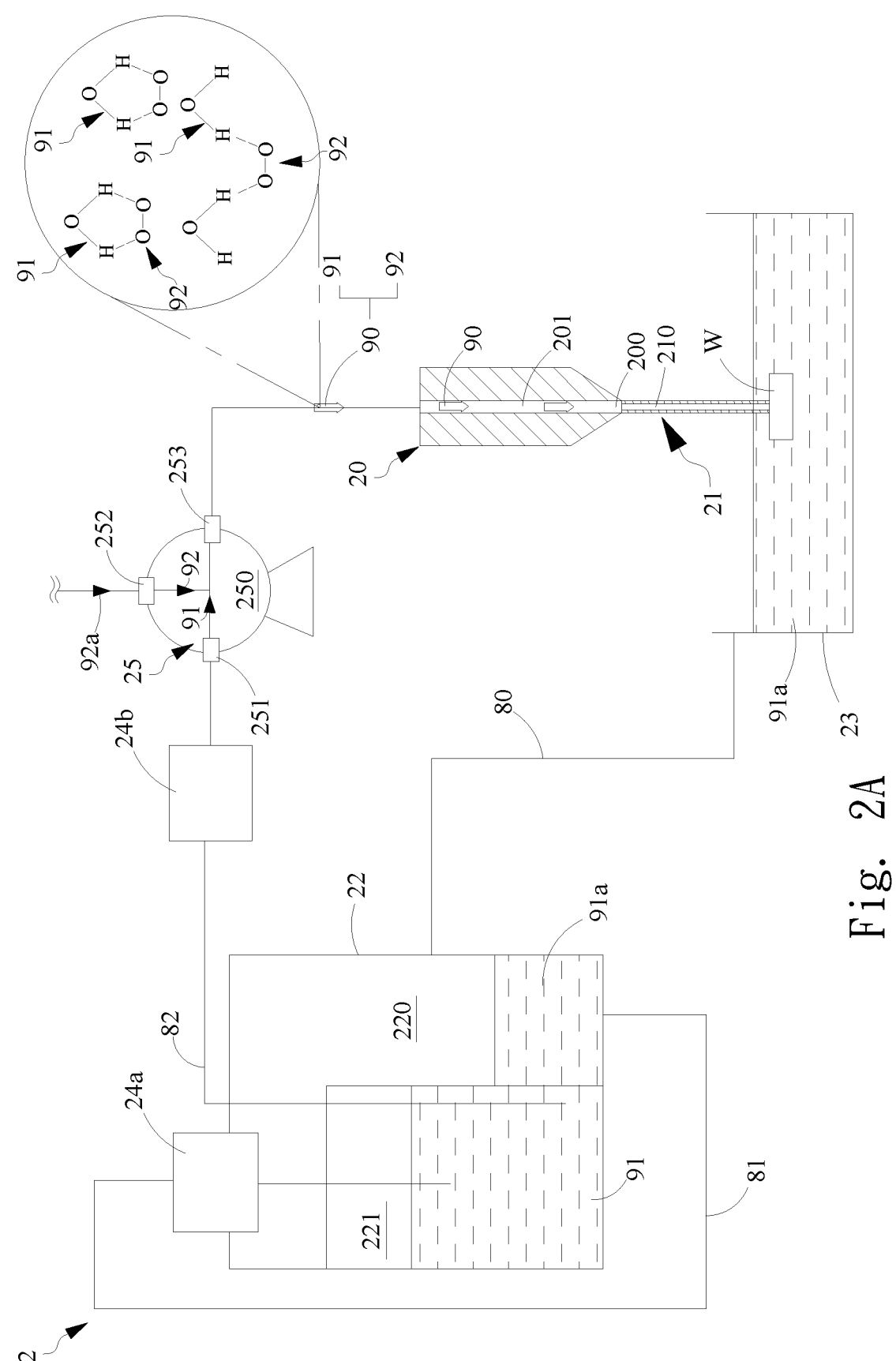
FIG. 2A illustrates a machining device according to one embodiment of the present invention.

Please refer to FIG. 2A, which illustrates a first embodiment of machining device of the present invention. In the present embodiment, the machining device 2 can be, but should not be limited to, drilling EDM for machining deep holes or tiny holes. The machining device 2 drives a wire electrode 21 to perform a machining process on the work piece W. The machining device 2 comprises an injection head 20 and a wire electrode 21. The injection head 20 comprises a nozzle 200 and a flow channel 201 formed inside the injection head 20 and communicated with the nozzle 200. A machining fluid 90 is guided by the flow channel 201 and is injected from the nozzle 200. In the present embodiment, the machining fluid 90 is a supersaturated machining fluid, which comprises a first phase fluid 91 and a second phase fluid 92, which is a gaseous solute, i.e. second phase fluid 92, supersaturated dissolved in liquid solvent, i.e. the first phase fluid 91. In means that the second phase fluid 92 can be dissolved in the first phase fluid 91 under highly pressured environment, because the solubility of a gas in a liquid increases with increasing gas pressure. Therefore, when the external pressure is reduced, i.e. the machining fluid 90 is exhausted by the nozzle 200 to the machining area, the excess gas, i.e., the second phase fluid 92 comes out of solution for improving the machining process. In one embodiment, the first phase fluid 91 is a liquid phase under normal pressure and normal temperature, e.g. 25° C. and 1 atm, for example. The first phase fluid 91 can be, but should not be limited to, water, oil or a combination of water and oil. In the present embodiment, the first phase fluid 91 is water.

The first phase fluid 91 is stored inside the accommodating device 22 comprising a first tank 220 and a second tank 221, wherein the first tank 220 is connected to the machining chamber 23 through pipelines 80 and the second tank 221 is connected to the first tank 220 through pipelines 81. The pipeline 80 guided the used first phase fluid 91a in the first tank 220 to a first filtering element 24a. The used first phase fluid 91a is filtered by the first filtering element 24a so as to form a clean first phase fluid 91 flowing into the second tank 221. In the present embodiment, the first filtering element 24a can allow the particles having diameter smaller than 10 μm passing therethrough.

A high pressure pump 25 is operated to draw the clean first phase fluid 91 to the second filtering element 24b through the pipelines 82. The high pressure pump 25 comprises a pump body 250, a first inlet 251, a second inlet 252, and an outlet 253 connected to the injection head 20, wherein the first inlet 250 is configured to guide the first phase fluid 91 flowing into the pump body 250, and the second inlet 252 is configured to guide the gas 92a into pump body 250. The high pressure generated by the high pressure pump 25 is utilized to compress the gas 92a so as to increase the solubility, e.g., mole quantity amount, of the gas 92a dissolved into the first phase fluid 91. In the present embodiment, the dissolved second phase fluid 92 in the first phase fluid 91, which is water in this embodiment, is oxygen ($O_2$) thereby forming the machining fluid 90. When the oxygen is dissolved in the water in which hydrates formed by single $H_2O$ molecular with two oxygen atoms, and dehydrates formed by two $H_2O$ molecular with two oxygen atoms. Please refer to FIG. 2A, which illustrates the hydrate and dehydrate having hydrogen bond for bonding the oxygen atoms. According to the reasearch, in the hydrate having oxygen and water $H_2O$, the atom of oxygen (O) formed hydrogen bond with the O—H of water $H_2O$. The second phase fluid 92 is then dissolved into the first phase fluid 91 thereby forming the machining fluid 90 exhausted from the outlet 253. It is noted that the gas 92a is not limited to the combustion gas 02. Alternatively, the gas 92a can also be flammable gas, such as hydrogen or hydrocarbon gas (hydrocarbons), or a combination of flammable gas and combustion gas. In the present embodiment, the high pressure pump 25 can generate at least 25 MPa high pressure for compressing the gas 92a such that the gas 92a can be dissolved into the first phase fluid 91 under the compression of high pressure.

The wire electrode 21 is configured to receive the machining fluid 90 injected from the nozzle 200. In the present embodiment, the wire electrode 21 is connected to the nozzle 200. The wire electrode 21 further comprises a hollow channel 210 for guiding the machining fluid 90 injected from the nozzle 200. The wire electrode is a tubular electrode having the hollow channel 210 formed therein and the material for forming the wire electrode 21 can be, but should not be limited to, copper. In one embodiment, the diameter of the wire electrode can be, but should not be limited to, the range between 0.1 mm~1 mm. Since the flammable gas, combustion gas or the combination of the flammable gas and the combustion gas is utilized as the second phase fluid and is pressurized to be dissolved into the first phase fluid 91 for forming the machining fluid 90, the machining fluid 90 can be burned to generate heat during the EDM process, whereby the generated heat can be utilized to improve the efficiency of EDM process when the tiny hole or deep hole is processed. Moreover, it is noted that the chemical product after burning hydrogen and oxygen during the electrical discharge machining process will not be hazardous gas but will be water instead. Likewise, when the hydrocarbon gas (hydrocarbons) is utilized as the gas dissolved in the machining fluid, the chemical product during the electrical discharge machining process will not be hazardous gas but will be water and carbon dioxide instead, which is also a non-hazardous product during the EDM process.

In addition, according to Hagne-Poiseuille's equation, the viscosity of the pure water (0.8 mPa-s) is 44 times of the air viscosity (18 μPa-s); therefore, when the gas is mixed into the first phase fluid for forming the machining fluid, it is capable of reducing the dynamic viscosity μ of the machining fluid and reducing the pressure loss ΔP. Furthermore, the friction force between the machining fluid and the inner wall of the flow channel can be reduced by reducing the dynamic viscosity μ such that the machining fluid can easily pass through the tiny diameter of hollow channel formed in the wire electrode thereby improving machining precision and efficiency. Moreover, since the fluidity of the machining fluid 90 is improved, the pressure loss is greatly reduced whereby when the machining fluid is injected into the wire electrode 21 by the injection head 20, it is more effectively to inject the machining fluid to the machining position on the work piece when the wire electrode 21 performing tiny hole or deep hole machining process thereby achieving effects of cooling, discharging the machining debris and lubrication. Furthermore, it is noted that the dissolved second phase fluid 92, e.g. gas in the present embodiment, in the first phase fluid 91 will escape from the first phase fluid 91 after the machining fluid is injected from the high pressure environment such as nozzle or wire electrode, to the environment of normal pressure, such as machining chamber 23, for example. Although the second phase fluid 92 will escape from the first phase fluid 91 after being injected out of the wire electrode 21, since the injected machining fluid is still with high pressure and it takes time for the second phase fluid 92 emitting to the environment having normal pressure, there still has sufficient time for machining fluid having the second phase fluid 92 to finish the machining process before the second phase fluid 92 escaping from the first phase fluid 91.

Alternatively, in another embodiment, the machining fluid 90 further comprises micro scale bubbles and nano scale bubbles, which can be added into the first phase fluid 91 in advanced. Alternatively, a channel can be arranged inside the injection head 20 whereby the gas around the injection head 20 is drawn into the flow channel 201 by a negative pressure generated when the high-pressurized machining fluid 90 passing through the flow channel 201 and the drawn gas is cut by the high-pressured machining fluid 90 so as to form gas bubble structures.

Figure 1A:
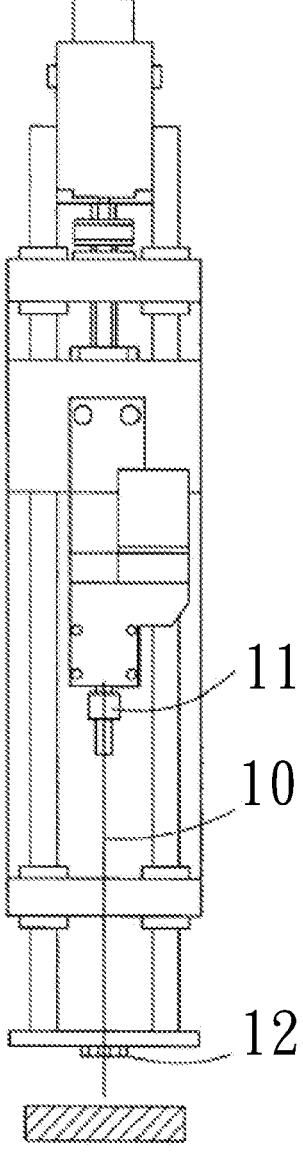
FIG. 1A illustrates a convention electrical discharge machining device.
Figure 1B:
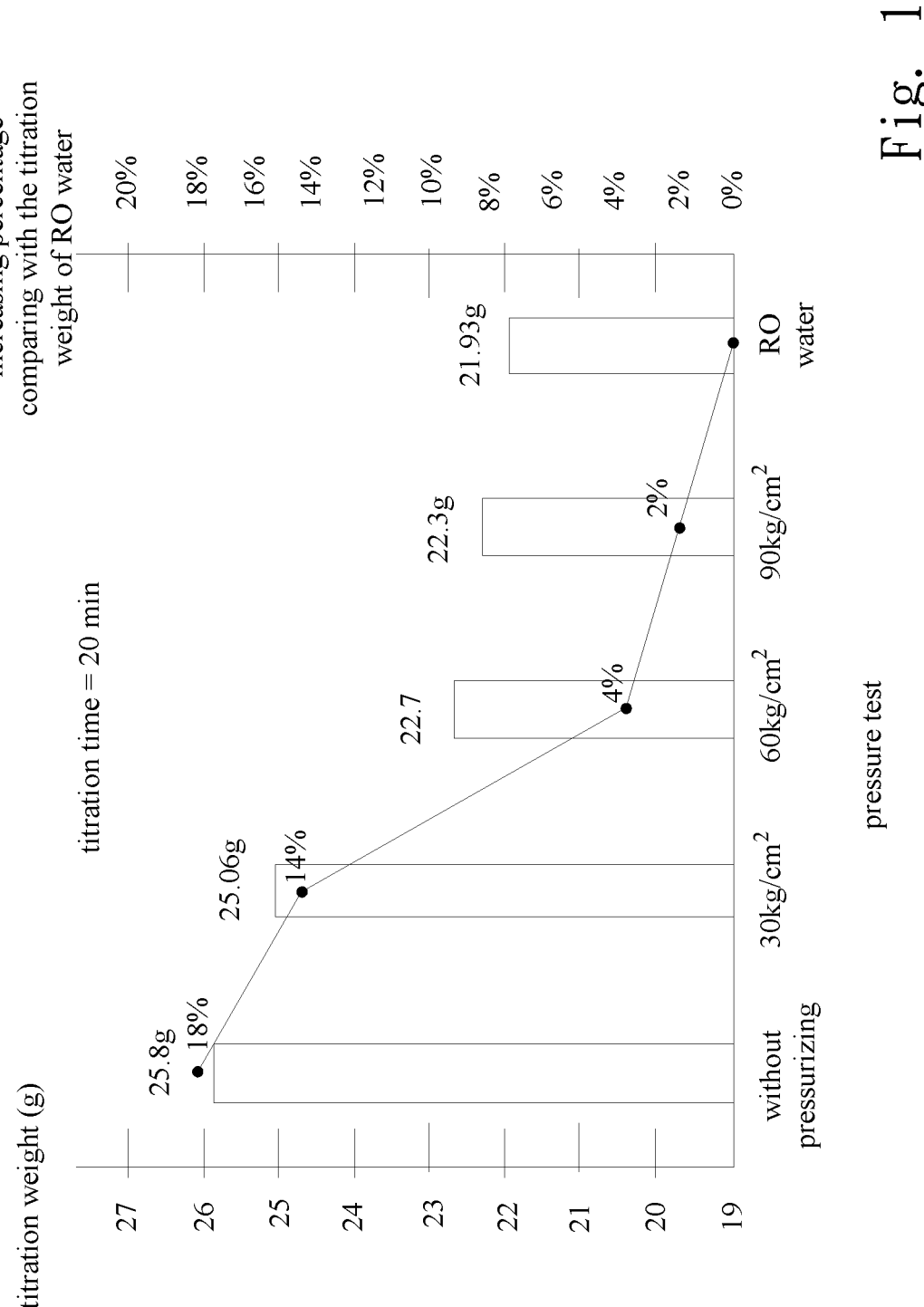
FIG. 1B illustrates a weight measurement result of titration experiment under normal pressure with respect to different machining fluid having micro or nano scale bubbles exerted by different pressure test.

The micro scale bubbles or nano scale bubbles can be formed by flammable gas, combustion gas, or a combination of flammable gas and combustion gas. The machining fluid 90 having the micro scale bubbles or nano scale bubbles can reduce the viscosity of the machining fluid 90 and improve the machining efficiency through the assistance of support combustion or spontaneous combustion during the machining process. According to the FIG. 1B shown the titration result, when the machining fluid 90 is pressurized by the pressure smaller than the 30 kg/cm$^2$, the micro scale bubbles or nano scale bubbles can be maintained without being broken. When the machining fluid 90 is pressurized by pressure larger than the 30 kg/cm$^2$, the micro scale bubbles or nano scale bubbles might be broken and dissolved into the machining fluid 90. No matter the pressure of the machining fluid 90 is larger or smaller than 30 kg/cm$^2$, the dynamic viscosity μ of the machining fluid 90 will be reduced such that the pressure loss of the machining fluid 90 can be reduced.

Figure 2B:
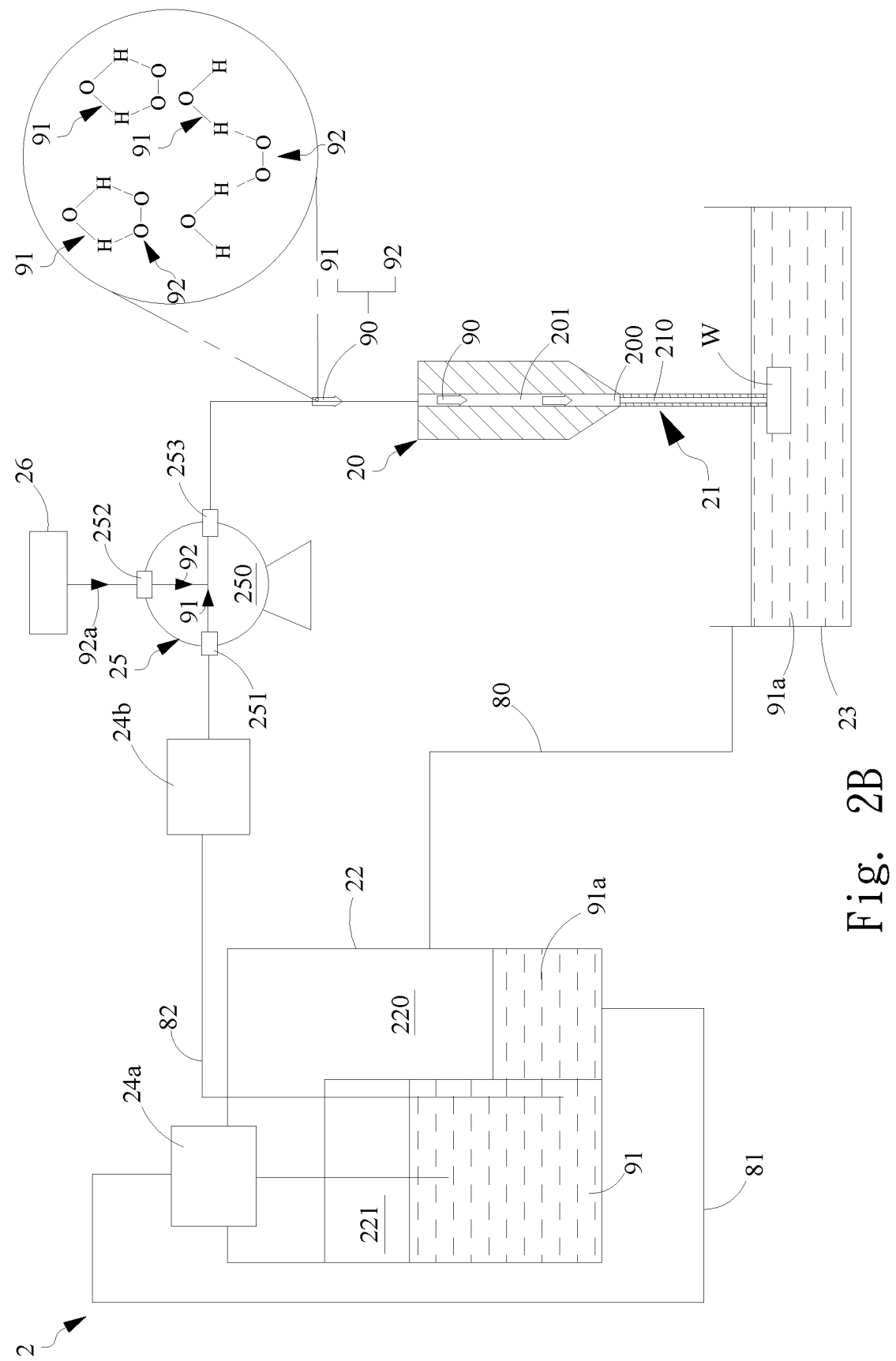
FIG. 2B illustrates a machining device according to another embodiment of the present invention.

Please refer to FIG. 2B, which illustrates machining device according to one embodiment of the present invention. In the present invention, basically, it is similar to the embodiment shown in FIG. 2A, the difference part is that an electrolysis device 26 is connected to the high pressure pump 25. The electrolysis device 26 can generate hydrogen and oxygen through electrolysis reaction. The hydrogen and oxygen can be supply to the high pressure pump 25 according to the user's need.

Figure 6B:
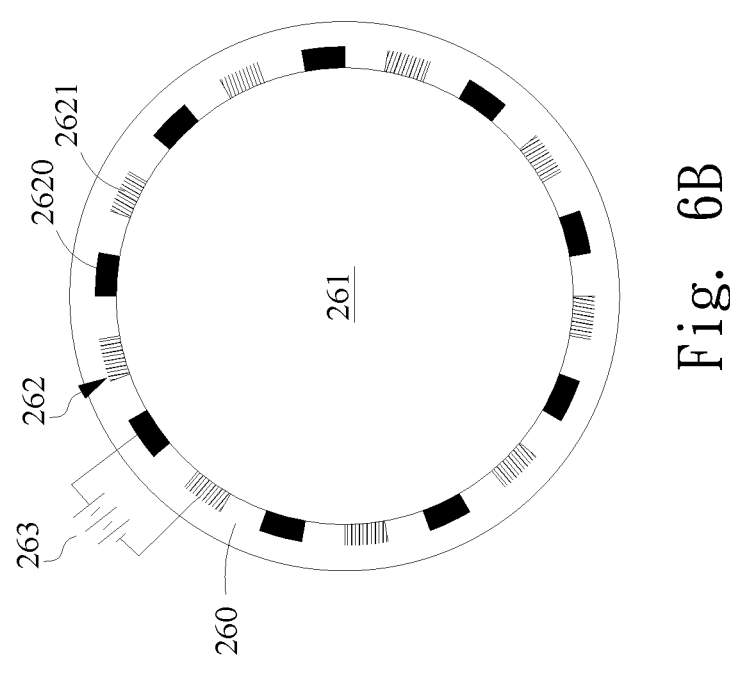
FIGS. 6A and 6B respectively illustrates electrolysis device according to different embodiments of the present invention.
Figure 6A:
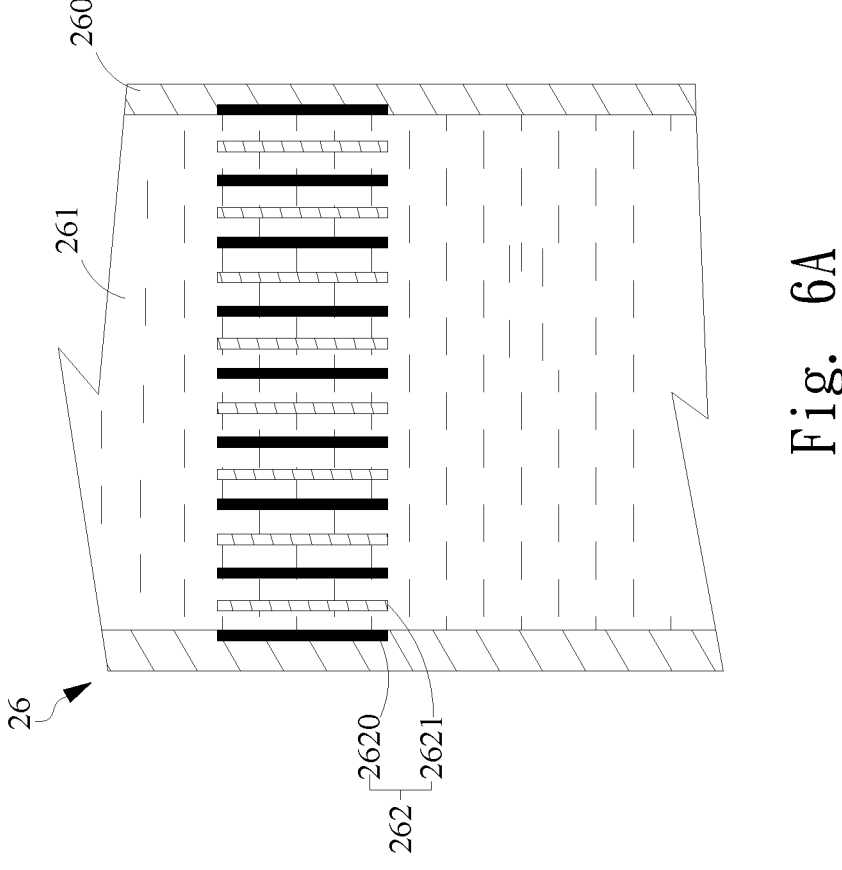

Please refer to FIG. 6A and FIG. 6B, in one embodiment of the electrolysis device 26, the electrolysis device 26 further has an accommodating space 261 within the pipeline 260 for allowing the reaction fluid passing therethrough. The reaction fluid in the present embodiment is an electrolysis fluid. The inner wall of the pipeline 260 has electrolysis electrode unit 262 for performing a chemical reaction with the reaction fluid for generating bubbles. In the embodiment shown in FIG. 6B, the electrolysis electrode unit 262 comprises a plurality of anodes 2620 and cathodes 2621 which are alternately arranged around the circumferential of the pipeline 260. In the present embodiment, the each electrode is long striped electrode. The longitudinal axis is parallel to the central axis of the pipeline 260. In the present embodiment, the reaction fluid may contain electrolyte such as H$_2$O, NaOH, K$_2$CO$_3$, Na$_2$CO$_3$, NaHCO$_3$, KHCO$_3$, CaCO$_3$, NaCl, or H$_2$SO$_4$, for example. Taking the reaction fluid having NaOH and water (H$_2$O) as one example, when the electrical power is provided to the electrolysis electrode unit 262, the hydrogen ions (H$^+$) in the water flow toward to the cathode for generating hydrogen while the hydroxide ions (OH$^-$) flow toward the cathode for generating oxygen. Therefore, in one embodiment, the hydrogen bubbles or oxygen bubbles generated by the electrolysis reaction can be the second phase fluid of the present invention.

Figure 7:
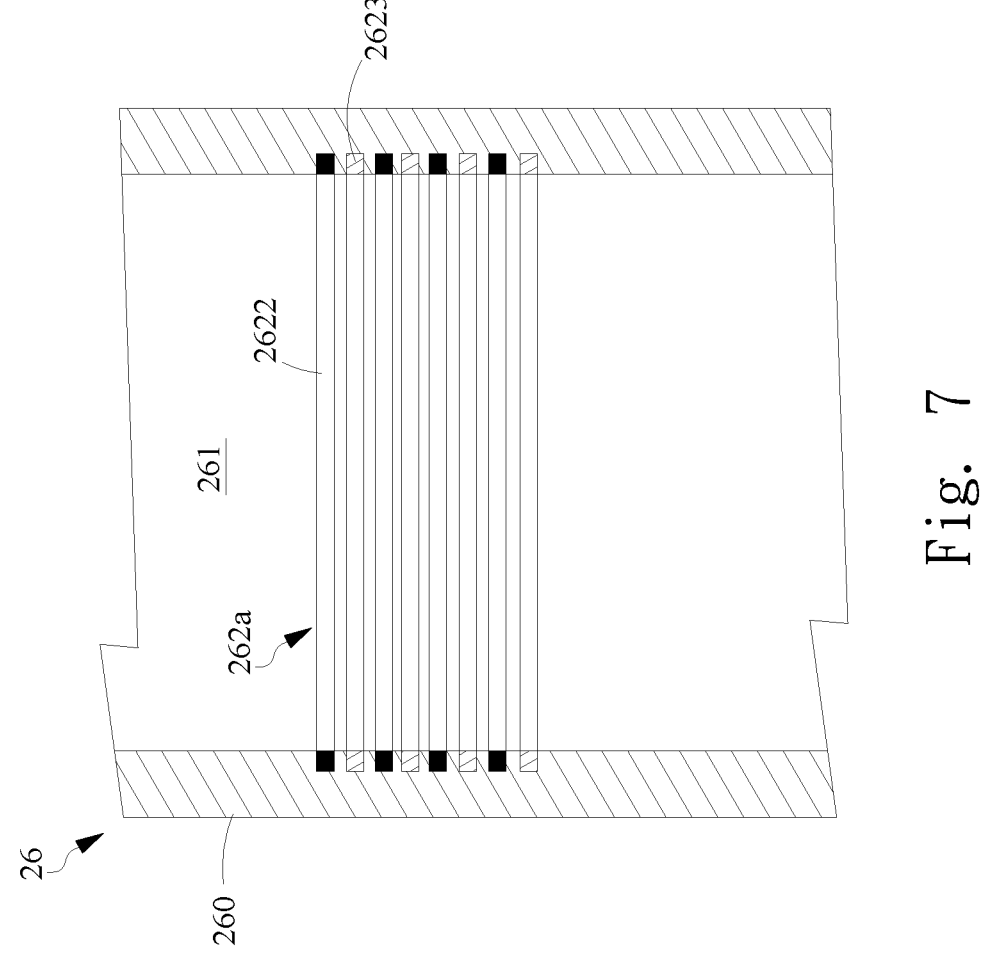
FIG. 7 illustrates electrolysis device according to another embodiment of the present invention.

Next, the operation of the embodiments shown in FIG. 6A and FIG. 6B are explained below. Since the plurality of cathodes 2621 and anodes 2620 are alternately embedded into the inner wall of the pipeline 260 for forming the electrolysis electrode unit 262, when the power source 263 provides electrical power to the electrolysis electrode unit 262, the reaction fluid inside the pipeline 260 has electrolysis reaction with the anodes 2620 and cathode 2621 whereby the anodes 2620 generate oxygen and the cathodes 2621 generate hydrogen. The electrolysis reaction is well known by the one having ordinary skilled in the art, and the principle of the electrolysis reaction will not be further described hereinafter. Please refer to the FIG. 2B. The gas 92a generated by the electrolysis reaction enters the pump body 250 through the second inlet 252. The pump body 250 provides high pressure on the gas 92a so as to increase the mole quantity amount of the gas 92a dissolved into the first phase fluid 91. Please refer FIG. 7, which is similar to the embodiments of FIGS. 6A and 6B and the different part is that the anode 2622 and cathode 2623 of the electrolysis electrode unit 262a are annular structures alternately arranged along the central axis of the pipeline 260. The electrolysis reaction is the same as the previously-described embodiment, which is not further described hereinafter.

Figure 3A:
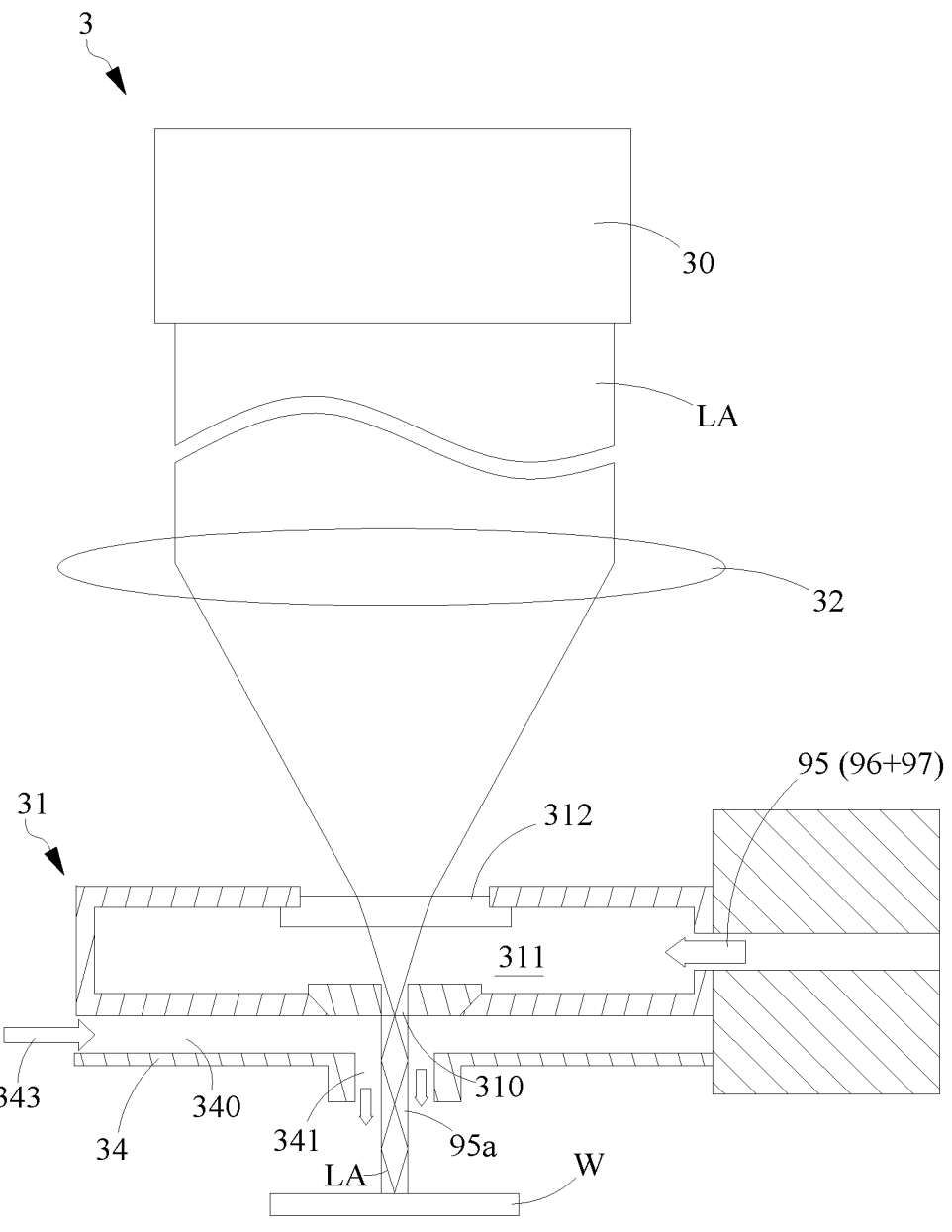
FIG. 3A illustrates a machining device according to another embodiment of the present invention.

Please refer to FIG. 3A, which illustrates a machining device according to another embodiment of the present invention. In the present embodiment, the machining device 3 comprises an optical source 30, nozzle device 31, and a gas injection device 34. The optical source 30 is configured to generate a laser beam LA. It is noted that the method for generating laser beam LA is well known by the one having ordinary skilled in the art, which will not be described in detail hereinafter. The laser beam LA is focused to pass through the nozzle device 31 through an optical lens module 32. The nozzle device 31 comprises a nozzle 310 and a flow channel 311 connected to the nozzle 310 and configured to guide the machining fluid 95 whereby the machining fluid 95 is injected to form high pressure flow 95a to the work piece W by the nozzle 310. The machining fluid 95 in the present embodiment comprises a first phase fluid 96 and a second phase fluid 97. The gas injection device 34 arranged at a lateral side of the nozzle device 31 comprises a flow channel 340 formed therein for providing a gas 343, such as air, flammable gas, or combustion gas, for example, passing therethrough.

The gas injection device 34 further comprises a gas nozzle 341 corresponding to the nozzle 310 for providing gas 343 injected toward the work piece W, wherein the gas 343 surrounds the peripheral surface of the high pressure flow 95a.

Alternatively, the machining fluid 95 has a plurality of micro scale bubbles. The first phase fluid 96 is liquid, such as water for example, and the second phase fluid 97 is gas. In one embodiment, the gas is flammable gas, such as hydrogen, ammonia, natural gas, methane, or ethane, for example. Alternatively, in one embodiment, the second phase fluid 97 is combustion gas, such as oxygen, for example. In addition, the second phase fluid 97 can also be a combination of flammable gas and combustion gas. In the present embodiment, the volume fraction of the first phase fluid 96 is 90~99% while the volume fraction of the second phase fluid 97 is 1~10%.

Figure 3B:
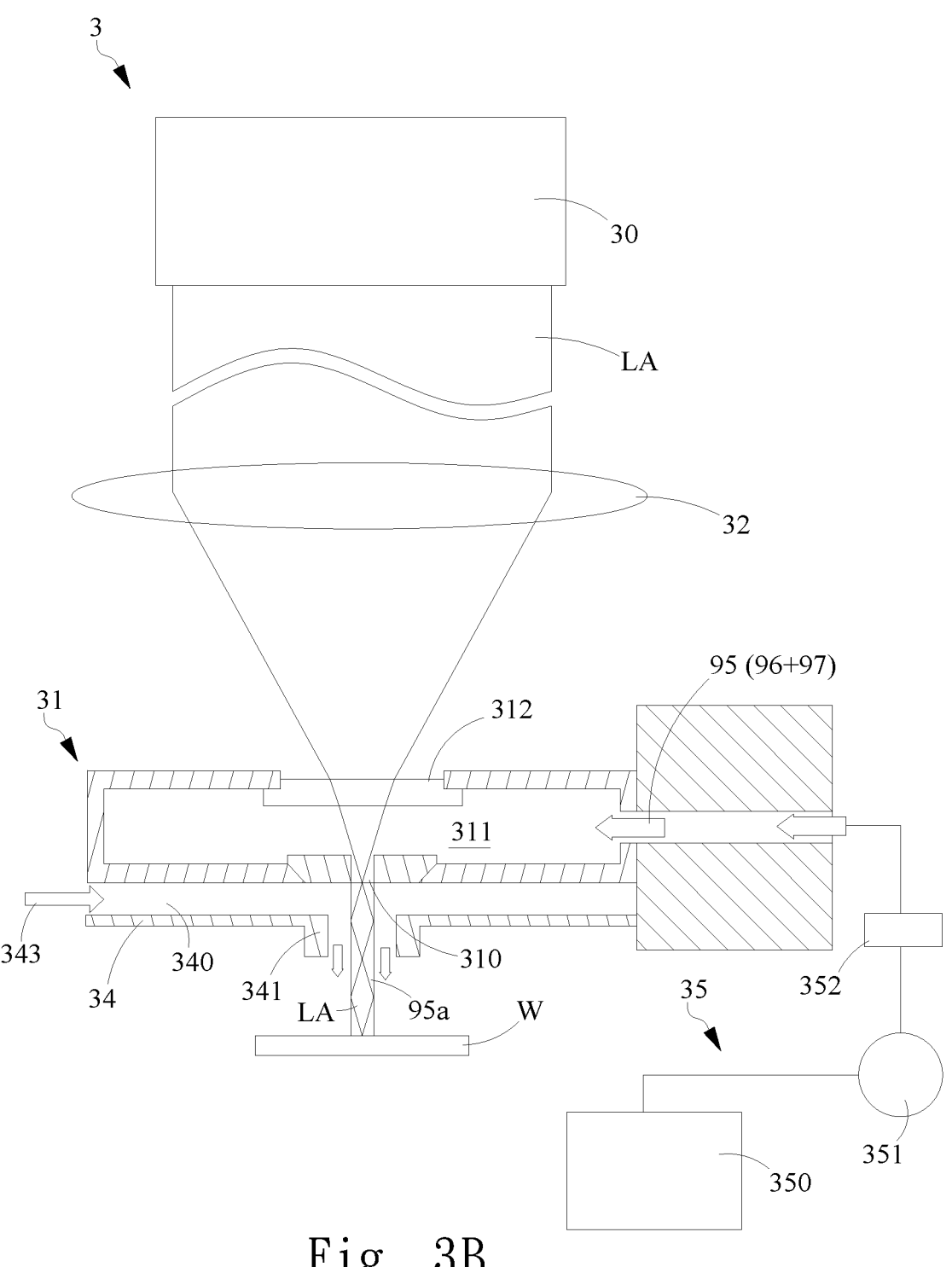
FIG. 3B illustrates a machining device according to another embodiment of the present invention.

In another embodiment shown in FIG. 3B, it illustrates a machining device according to another embodiment of the present invention. In the embodiment shown in FIG. 3B, basically, it is similar to the embodiment shown in FIG. 3A, the different part is that a machining fluid supplying device 35 is adapted for providing the machining fluid 95. The machining fluid supply device 35 further comprises a liquid supplying source 350, high pressure pump 351 and electrolysis device 352. The high pressure pump 351 is connected to the liquid supplying source 350 through pipeline for pumping the liquid from the liquid supplying source 350, wherein the liquid drawn from the liquid supplying source 350 is utilized as the first phase flow. The liquid stored in the liquid supplying source 350 can be, but should not be limited to, water or liquid having electrolyte. The high pressure pump 351 provides a high pressure, such as 0.3 Mpa~80 MPa, for example, onto the liquid drawn out of the liquid supplying source 350. The electrolysis device 352 is connected to the high pressure pump 351 through pipelines for receiving the liquid from the liquid supplying source 350 such that the pressurized liquid can perform an electrolysis reaction in the electrolysis device 352. Since the liquid from the liquid supplying source 350 is still maintained in high pressurized status when passing through the electrolysis device 352, the gas generated from the electrolysis device can be utilized as the second phase fluid, such as oxygen or hydrogen, for example, dissolved in the first phase fluid flowing inside the pipeline under high pressure status thereby forming the machining fluid 95.

Figure 8:
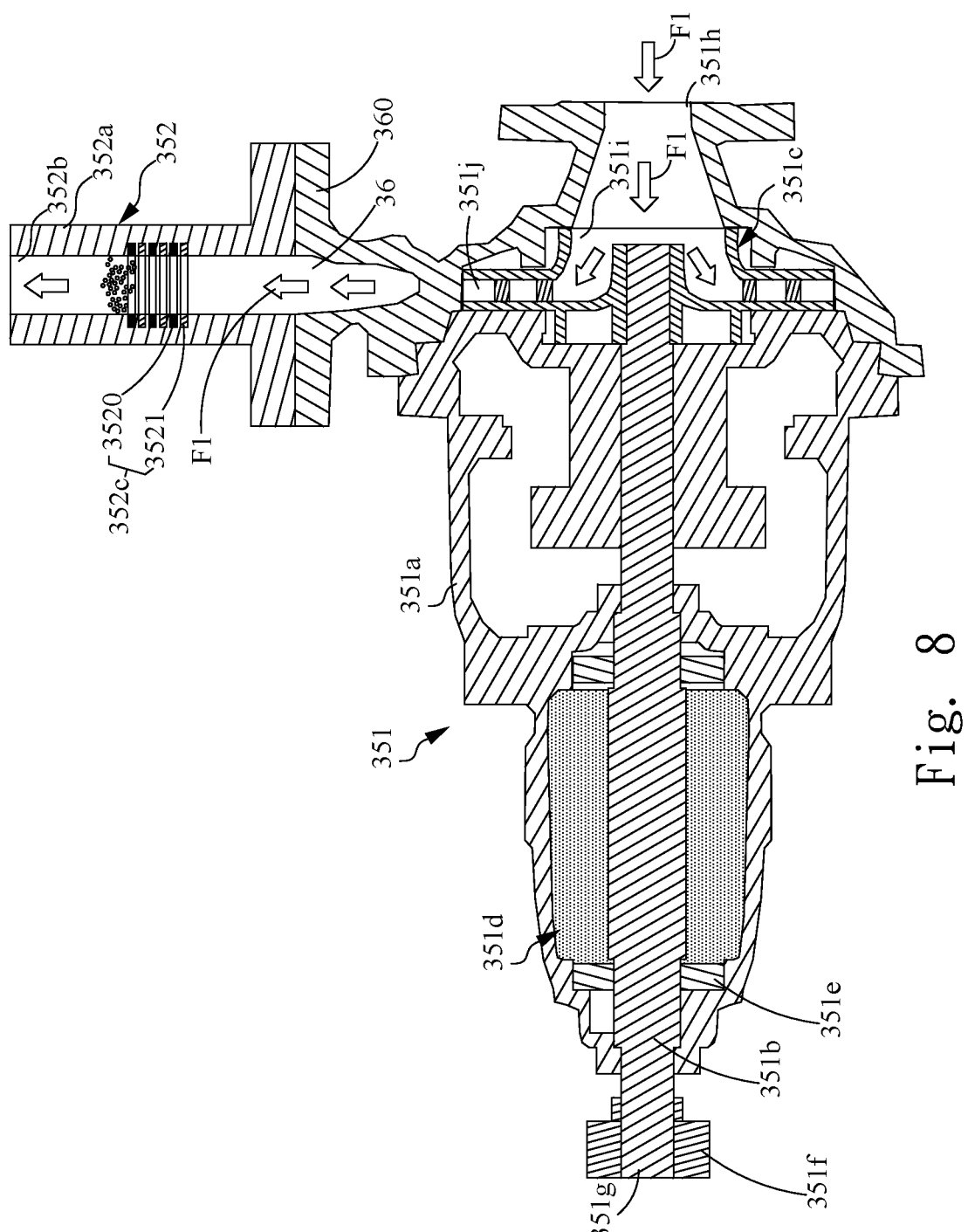
FIG. 8 illustrates electrolysis device according to another embodiment of the present invention.

Please refer to FIG. 8, which illustrates one embodiment integrating the high pressure pump 351 and electrolysis device 352. In the present embodiment, the high pressure pump 351 has a housing 351a, rotating shaft 351b and a rotating element 351c. The housing 351a has a motor body 351d arranged therein, and a plurality of bearings 351e for assisting the rotation of the rotating shaft 351b. In addition, a supporting base 351f for rotatably supporting one end 351g of the rotating shaft 351b is arranged at one side of the housing 351a. The housing 351a further comprises an opening 351h at the other side for communicating with the flow inlet 351i of the rotating element 35 so as to enable the first phase fluid F1 entering the housing 351a and then flowing into the rotating element 351c. It is noted that the structure of the high pressure pump 351 is well known by the one having ordinary skilled in the art, and the detail of the high pressure pump will not be described hereinafter. The pressure provided by the high pressure pump 351 can be ranged between 0.3 Mpa~80 Mpa. The rotating element 351c in the present embodiment is a turbine wheel coupled to one end of the rotating shaft 351b. The rotating element 351c further comprises a cycloid channel 351j. In addition, an exhausting part 36 is formed at one side of the housing 351a, wherein an exhausting outlet 360 of the exhausting part 36 is communicated with the cycloid channel 351j whereby the first phase fluid F1 entering into the cycloid channel 351j can be can be exhausted out of the cycloid channel 351j and then flows into the electrolysis device 352. In the present embodiment, the electrolysis device 352 further comprises pipe tube 352a having a flowing channel 352b formed therein for enabling the first phase fluid passing therethrough. The channel wall of the flow channel 352b of the pipe tube 352a further comprises an electrolysis electrode 352c having a plurality of ring-shaped positive electrode plate 3520 and ring-shaped negative electrode plate 3521 alternately and sequentially arranged on the channel wall along the axial direction of the pipe tube 352a.

Next, the operation of the high pressure pump and electrolysis device shown in FIG. 8 is explained below. When the rotating shaft 351b is driven to rotate by the motor body 351d, the rotating element 351c is also driven to rotate by the rotation of the rotating shaft 351b thereby a negative pressure is generated by the rotation of the rotating element 351c such that the first phase fluid F1 is sucked into the cycloid channels 351j from the from the flow inlet 351i, and is exhausted out of the cycloid channel 351j by the centrifugal force due to the rotation of the rotating element 351c. The exhausted first phase fluid F1 flows into the electrolysis device 352 so that the gas generated by the electrolysis reaction can be dissolved into the first phase fluid F1 through the high pressure generated by the high pressure pump 351. In one embodiment, the first phase fluid F1 contains electrolyte which can be, but should not be limited to H₂O, NaOH, K₂CO₃, Na₂CO₃, NaHCO₃, KHCO₃, CaCO₃, NaCl, or H₂SO₄. It is noted that the electrodes arrangement is not limited to the embodiment shown in FIG. 7. Alternatively, in another embodiment, the arrangement of the electrode can be the embodiment shown in FIGS. 6A and 6B, i.e. a plurality of straight shape electrodes are alternately arranged on the channel wall along the circumferential direction of the pipe tube 352a.

Figure 4:
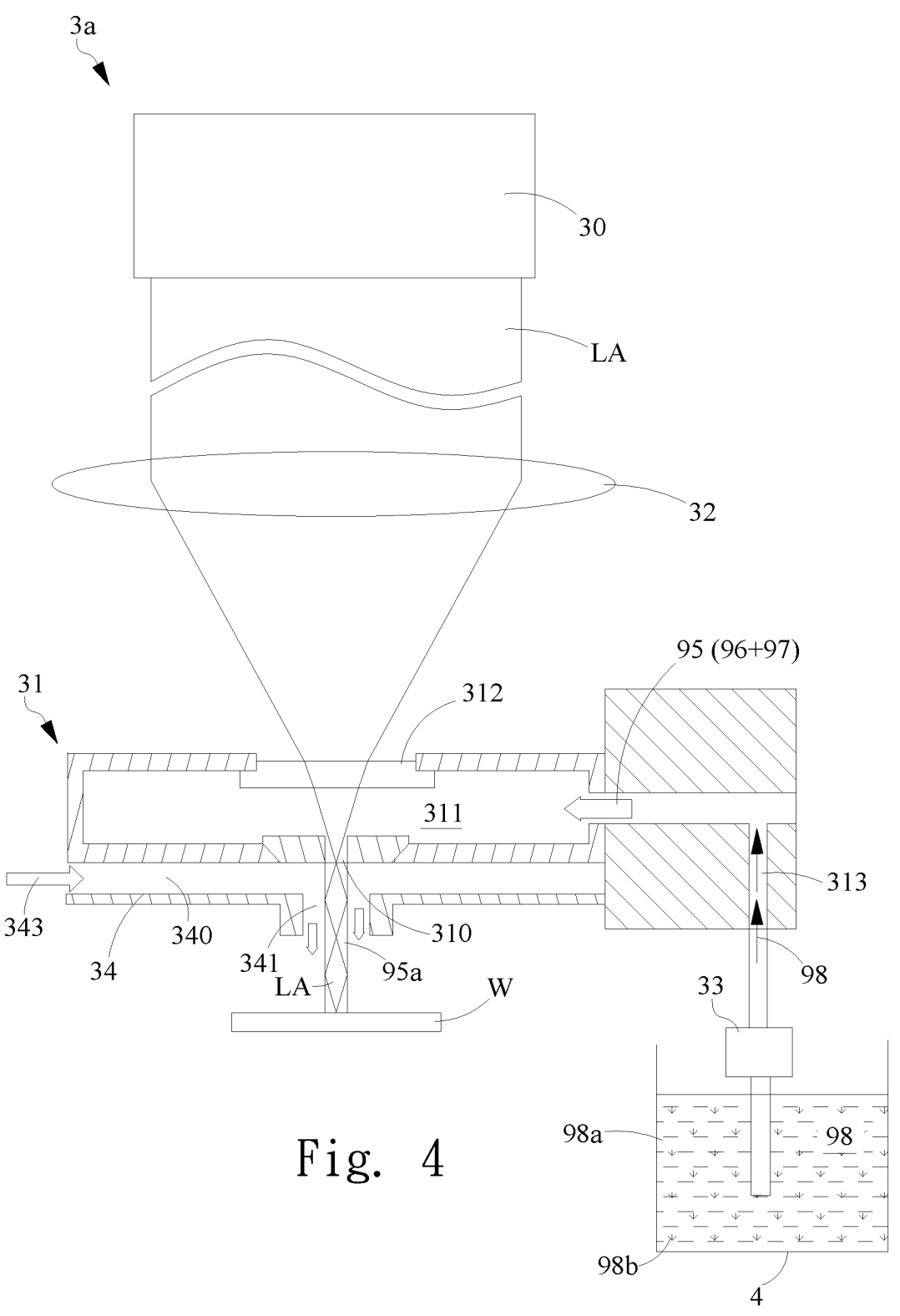
FIG. 4 illustrates a machining device according to another embodiment of the present invention.

Please refer FIG. 4, which illustrates a machining device according to another embodiment of the present invention. The machining device 3a basically is similar to the embodiment shown in FIG. 3A or 3B, and the different part is that the nozzle device 31 further comprises a first channel 313 communicated with the flow channel 311. The first flow channel 313 provides an auxiliary fluid 98 mixed with the machining fluid 95 after the auxiliary fluid 98 entering the flow channel 311, wherein the auxiliary fluid 98 further comprises a liquid 98a and a plurality of grinding particles 98b. In the present embodiment, the grinding particles 98b can be, but should not be limited to, nano particles or mixture combing bubbles and particles, in which the combination of bubbles and particles are published by the Japanese publication No. S59-93239, and it will not be further described hereinafter. In the embodiment shown in FIG. 4, the auxiliary fluid 98 is supplied by a liquid tank 4. The auxiliary fluid 98 is drawn from the liquid tank 4 by the pump 33 and is guided to the nozzle device 31 through pipelines. In the present embodiment, the fluid inside the nozzle 31 is a mixture of machining fluid 95 and the auxiliary fluid 98. It is noted that, in order to prevent the energy loss of laser beam LA due to the grinding particles inside the machining fluid 95, in one alternative embodiment, the diameter of the grinding particles is smaller than 0.1λ, wherein λ is the wavelength of the laser beam. Although the scatting effect would be still generated when the particles size is smaller than 0.1λ, the generated scattering effect belongs to the Rayleigh scattering effect so that the energy loss of the laser beam can be greatly minimized.

Figure 5:
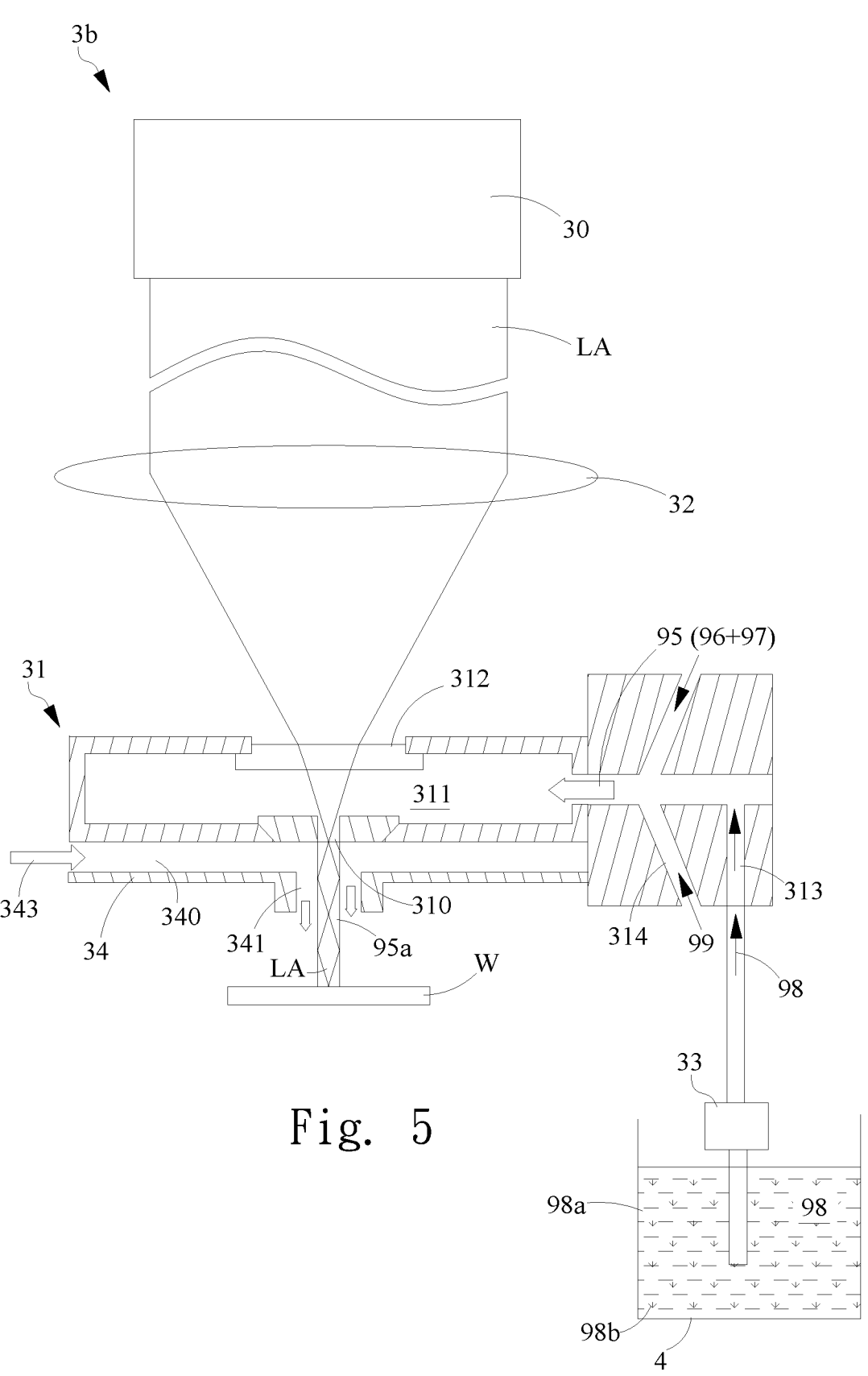
FIG. 5 illustrates a machining device according to another embodiment of the present invention.

Please refer to FIG. 5, which illustrates machining device according to another embodiment of the present invention. In the present embodiment, the machining device 3b is basically similar to the embodiment shown in FIG. 4, and the different part is that the nozzle device 31 further comprises a second flow channel 314 communicated with the flow channel 311 for providing a second auxiliary fluid 99 entering the flow channel 311. In the present embodiment, the second auxiliary fluid 99 is air in the environment surrounding the machining device 3b and the second auxiliary fluid 99 enters the flow channel 311 through the second flow channel 314. It is noted that, in another embodiment, the second auxiliary fluid 99 is not limited to the air. Alternatively, it can be a specific gas, such as oxygen, hydrogen or other kinds of gas, for example, conducted by the second flow channel 314 and then entering the flow channel 311. In the present embodiment, the machining fluid 95 injected by the nozzle device 31 is a mixture of first and second auxiliary fluids 98 and 99.

In the embodiments shown in FIGS. 3A-5, after the laser beam LA passes the lens module 32, the laser beam LA further passes the transparent element 312 of the nozzle device 31 and then enters the nozzle 310. In the present embodiment the laser beam LA is covered by the machining fluid 95 such that the laser beam LA can be transmitted to the work piece W through a total reflection within the machining fluid 95. Since the machining fluid 95 can contain flammable gas, combustion gas or combination of the flammable gas and combustion gas, the flammable gas or combustion gas can be burned due to the heat generated by the laser beam LA during the machining process thereby improving the laser machining efficiency.

While the present invention has been particularly shown and described with reference to a preferred embodiment, it will be understood by those skilled in the art that various changes in form and detail may be without departing from the spirit and scope of the present invention.

What is claimed is:

1. A machining device, comprising:
an injection head, comprising a nozzle, and a flow channel formed inside the injection head and communicated with the nozzle, wherein the flow channel is utilized to guide a machining fluid to the nozzle and the nozzle injected the machining fluid to a work piece, wherein machining fluid further comprises:
a first phase fluid, which is a liquid solvent; and
a second phase fluid, which is a gas that is dissolved in the first phase fluid through a high pressure such that the second phase fluid is supersaturated dissolved in the first phase fluid; and
a high pressure pump comprising a pump body, a first inlet, a second inlet, and an exhausting outlet communicated with the injection head, wherein the first inlet is utilized to guide the first phase fluid flowing into the pump body, the second inlet is utilized to guide the gas flowing into the pump body for forming the pressurized second phase fluid dissolving into the first phase fluid thereby forming the machining fluid exhausting out of the exhausting outlet.

2. The machining device of claim 1, wherein the gas is air, flammable gas, combustion gas, or a combination of the flammable gas and combustion gas.

3. The machining device of claim 1, wherein the machining fluid further comprises a plurality of micro bubbles wherein each micro bubble is formed by a flammable gas, combustion gas, or a combination of flammable gas and combustion gas.

4. The machining device of claim 2 wherein the combustion gas is hydrogen, and the flammable gas is hydrogen or hydrocarbon gas.

5. The machining device of claim 1, wherein the first phase fluid is water or oil.

6. The machining device of claim 1, wherein the second inlet further connects to an electrolysis device for providing the gas generated by the electrolysis reaction to the high pressure pump.

7. The machining device of claim 1, wherein the gas is pressurized by a high pressure ranged between 0.3 MPa~80 MPa.

8. A machining device, comprising:

an optical device, configured to generate a laser light; and an injection head, configured to comprise a nozzle and a flow channel communicated with the nozzle for guiding a machining liquid which is injected to a work piece-work piece through the nozzle, and to receive the laser beam projected to the work piece through the nozzle wherein the machining fluid further comprises a first phase fluid and a second phase fluid, wherein the first phase fluid is a liquid solvent, and the second phase fluid is a gas that is dissolved in the first phase fluid through a high pressure such that the second phase fluid is supersaturated dissolved in the first phase fluid; and a machining fluid supplying device comprising a liquid supplying source, a high pressure pump, and an electrolysis device, wherein the high pressure pump is connected to the liquid supplying source through a pipeline for drawing a reaction liquid stored in the liquid supplying source, and pressurizing the reaction liquid, the electrolysis device is connected to the high pressure pump through the pipeline for receiving the reaction liquid and generating the gas through an electrolysis reaction wherein the gas is pressurized to be dissolve into the reaction liquid flowing in the pipeline for forming the machining fluid.

9. The machining device according to the claim 8, wherein the machining fluid further comprising a plurality micro bubbles, the first phase fluid is liquid while the second phase fluid is gas, wherein a volume fraction of the first phase fluid is ranged between 90~99%, while a volume fraction of the second phase fluid is ranged between 1~10%.

10. The machining device of claim 8, wherein the gas is combustion gas, flammable gas, or a combination of the combustion gas and the flammable gas.

11. The machining device of claim 8, wherein the injection head further comprises a first flow channel communicated with the flow channel for providing a first auxiliary fluid flowing into the flow channel and being mixed with the machining fluid, wherein the first auxiliary fluid comprises a plurality grinding particles.

12. The machining device of claim 8, wherein the injection head further comprises a second flow channel communicated with the flow channel for guiding a second auxiliary fluid flowing into the flow channel.

13. The machining device of claim 8, wherein the gas is pressurized by a high pressure ranged between 0.3 MPa~80 MPa.

* * * * *